United States Patent [19]

Di Crispino

[11] 3,911,735

[45] Oct. 14, 1975

[54] PRESSURE TEST VESSEL WHICH ALLOWS UNRESTRAINED FLEXING OF SPHERICAL SEGMENT TEST SPECIMEN

[75] Inventor: Joseph S. Di Crispino, Baltimore, Md.

[73] Assignee: The United States of America as represented by the Secretary of the Navy, Washington, D.C.

[22] Filed: Mar. 5, 1974

[21] Appl. No.: 448,314

[52] U.S. Cl. .................................. 73/102; 73/37
[51] Int. Cl.² ......................................... G01N 3/12
[58] Field of Search ....... 73/102, 37, 49.8, 46, 49.2, 73/94, 395

[56] References Cited
UNITED STATES PATENTS
2,216,374  10/1940  Martin .................................. 73/395

Primary Examiner—Jerry W. Myracle
Attorney, Agent, or Firm—R. S. Sciascia; Q. E. Hodges; O. M. Wildensteiner

[57] ABSTRACT

A pressure test vessel for testing spherical segments. The test specimen surrounds a flexible sealing lip which projects from the inside surface of one of the end plates of the pressure vessel. When the vessel is pressurized, simulating external pressure on the test segment, the segment is free to contract in all dimensions; the flexible lip maintains a tight seal at all times.

7 Claims, 2 Drawing Figures

PRESSURE TEST VESSEL WHICH ALLOWS UNRESTRAINED FLEXING OF SPHERICAL SEGMENT TEST SPECIMEN

The invention described herein may be manufactured and used by or for the Government of the United States of America for Governmental purposes without the payment of any royalties thereon or therefor.

BACKGROUND

The present invention relates broadly to the testing of structures, and more particularly is concerned with destructive testing of segments of spherical structural members. Specifically, this invention is concerned with the testing of a spherical segment which simulates the stress levels in a total sphere employed as a hydrostatic pressure-resisting structural component in a deep submergence vehicle.

In many situations it is desirable to fabricate undersea containments from relatively high strength materials in order to withstand the hydrostatic pressures encountered at various ocean depths. As research vehicles descend to greater depths, the thickness of the containment vessel must be increased since high strength materials have yield strengths which closely approach the ultimate strengths of the materials. Additionally, because such high strength materials are less ductile than conventional hull materials, factors of safety must be accurately determined since failure modes are generally catastrophic.

In addition to the hydrostatic pressures acting on hull structures, consideration must also be given in certain instances to factors affecting the inside of spherical structures employed as fuel cell containment vessels; exposure of the inside of the vessel to cryogenic or corrosive fluids will adversely affect the material by diminishing the effective yield strength of a particular structural material.

In order to get test results that are valid, the test segment must be able to react to the pressure in the same manner that the full sphere will react. That is, the test segment must be free to contract when the external pressure is increased because the full sphere will contract under external pressure. Likewise, the test segment must be free to expand when internal pressure is increased, for the same reason. Prior art test vessels, which restrain the edges of the test segment and therefore do not allow this expansion and contraction, produce test results that do not exactly simulate the behavior of a full sphere.

SUMMARY OF THE PRESENT INVENTION

The present invention is a pressure test vessel that allows the test specimen, which is a segment of a sphere, to freely expand and contract in all directions. This is accomplished by providing a flexible lip on the inside of the vessel's end plate; the inside of the test specimen rests against this lip when the pressures on the two sides of the specimen are balanced. When the pressure on the outside of the specimen is increased, the specimen contracts; as it does so, the lip bends, allowing the specimen to move without interference but yet maintaining a pressure tight seal. When the pressure is reduced, the specimen expands to its normal dimensions and the lip also returns to its normal position.

OBJECTS OF THE INVENTION

Accordingly, it is an object of the present invention to provide an improved pressure test vessel for spherical segment test specimens.

It is a further object to provide a pressure test vessel which allows test specimens to freely expand and contract in all directions.

It is a further object to provide a test vessel which allows a segment of a sphere to simulate the behavior of a full sphere when subjected to external and internal pressure.

Other objects and advantages of the present invention will be apparent from the following specification and accompanying drawings.

DESCRIPTION OF THE PREFERRED EMBODIMENT

The present invention is an improvement over the pressure test vessels shown in my prior U.S. Pat. Nos. 3,673,862 and 3,610,032. In the vessels of these patents, the test specimen is restrained at its edges to an undesirable degree with the result that the specimen is not allowed to undergo the same deformations that the full sphere will undergo the same conditions.

Figure 1:
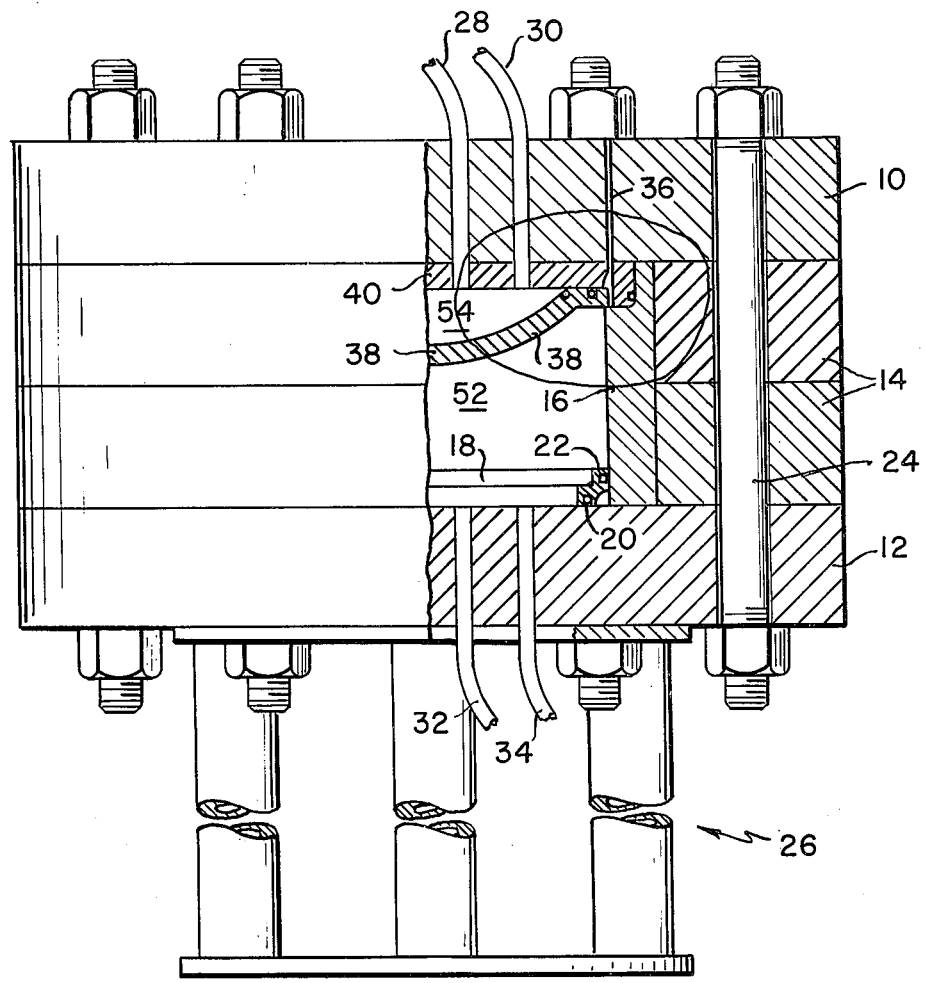
FIG. 1 is a partial cross section of a pressure test vessel according to the present invention with a test specimen installed.
Figure 2:
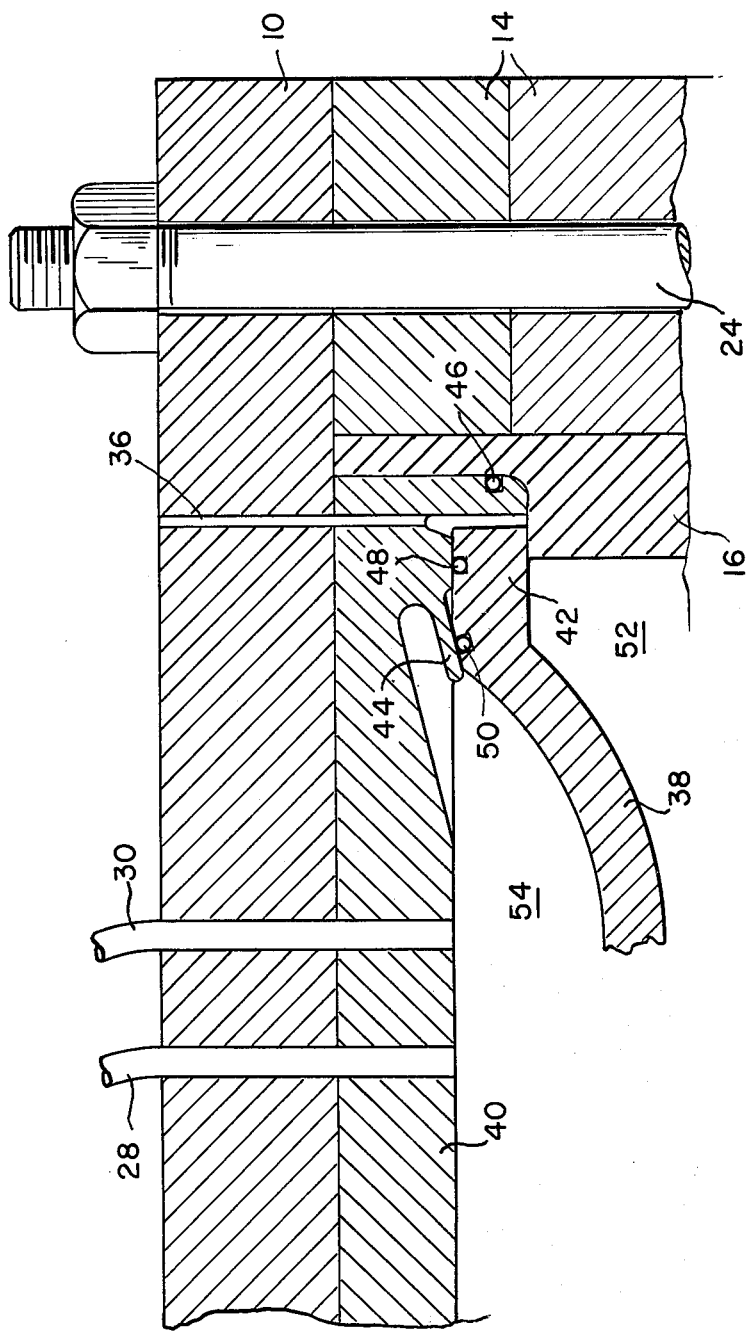
FIG. 2 is an enlarged view of the encircled portion of FIG. 1.

The pressure test vessel of the present invention, as shown in FIGS. 1 and 2, is comprised of end closures 10 and 12 and retaining rings 14. These members enclose pressure cylinder 16, which is of one piece construction to reduce the possibility of leakage. Sealing ring 18, which has O-rings 20 and 22 in it, seals the joint between cylinder 16 and end closure 12. End closures 10 and 12 and retaining rings 14 are held together by means of studs 24 as shown. The entire assembly is shown as being mounted on stand 26; however, any convenient method of support may be used. End closures 10 and 12 have holes in them for receipt of fluid lines 28, 30, 32, and 34 respectively; these are used to pressurize the vessel, and to purge it when desired. End closure 10 also has bleed passage 36 in it; this passage bleeds off any fluid that gets trapped in the region between the test specimen, the pressure cylinder, and the end plate (see FIG. 2).

Test specimen 38 is mounted as shown in FIG. 2. Pressure cylinder 16 is cut away at its upper periphery as shown to accommodate specimen 38 and upper plate 40. Flange 42 of specimen 38 is not clamped tightly between cylinder 16 and upper plate 40 as this would restrict its ability to move under the influence of pressure. Rather, flange 42 is allowed to slide between cylinder 16 and plate 40; however, there should not be a gap between any of the above parts. The space between the end of flange 42 and the peripheral projection on plate 40 is not critical as long as it is sufficient to allow the specimen to expand as much as is necessary.

The inside edge of specimen 38 rests on lip 44 of end plate 40; lip 44, as will be seen in FIG. 2, projects out from plate 40 at a slight angle. This angle is preferably about 15 degrees. O-rings 46, 48, and 50 seal the joints between the three parts.

In operation, fluid is introduced into chamber 52 by means of lines 32 and 34 to simulate external pressure on the sphere. This pressure causes specimen 38 to contract; flange 42 is free to slide radially inward between cylinder 16 and plate 40. As it does so, lip 44 flexes and O-ring 50 maintains a pressure tight seal against the specimen. Therefore, lip 44 follows the reactions of specimen 38 under the influence of pressure. Thus, specimen 38, while only a segment of a sphere, exactly simulates the uniform contraction of a complete sphere. Any fluid that seeps past flange 42 is bled off through bleed passage 36.

When the pressure is reduced, the specimen resumes its normal shape and lip 44 also resumes its normal shape. If desired, pressure within the interior of the sphere can also be simulated. This is done by introducing fluid into chamber 54 by means of lines 28 and 30. As the pressure in this chamber builds up, specimen 38 will be lifted off plate 40; however, the clearance between flange 42 and cylinder 16 is kept small enough to allow O-ring 48 to maintain a pressure-tight seal, preventing the escape of fluid from chamber 54. The space between the end of flange 42 and the peripheral projection on plate 40 allows the specimen to expand as much as is required by the pressure in chamber 54. Alternately pressurizing chambers 52 and 54 allows the accurate determination of the fatigue life of the sphere simulated by specimen 38, since there are no extraneous stresses induced in the specimen by the test vessel.

If a hazardous fluid is to be used to pressurize the interior of the segment of the sphere and it is desired to reduce the amount of fluid that is required, a solid plug can be utilized as described in U.S. Pat. 3,673,862 to reduce the volume of chamber 54.

It will be obvious to those skilled in the art that the contours of plate 40 can be machined into end closure 10, thereby saving the cost of making a separate plate 40. Obviously, many other modifications and variations of the present invention are possible in the light of the above teachings. It is therefore to be understood that within the scope of the appended claims the invention may be practiced otherwise than as specifically described.

What is claimed is:

1. A device for pressure testing segments of hollow spherical bodies, comprising:
   a vessel designed to withstand internal pressurization, said vessel having an end plate against which said segments rest;
   a hip on said end plate against which said segments rest; and
   means for maintaining a pressure differential across said segments.

2. A device as in claim 1 wherein said lip is able to flex with respect to said end plate.

3. A device as in claim 2 wherein said lip projects from said end plate at an angle of approximately 15°.

4. A device for pressure testing segments of hollow spherical bodies, comprising:
   a vessel designed to withstand internal pressurization;
   an end plate on said vessel against which said segments rest;
   sealing means on said end plate which cooperates with said segments and which follows the reaction of said segments under the influence of pressure; and
   means for maintaining a pressure differential across said segments.

5. A device as in claim 4 wherein said sealing means comprising a lip on said end plate.

6. A device as in claim 5 wherein said lip is able to flex with respect to said end plate.

7. A device as in claim 6 wherein said lip projects from said end plate at an angle of approximately 15°.

* * * * *